US009179413B2

(12) United States Patent
Carter et al.

(10) Patent No.: US 9,179,413 B2
(45) Date of Patent: Nov. 3, 2015

(54) ACCESS POINT POWER CONTROL

(71) Applicant: Ubiquisys Limited, Swindon, Wiltshire (GB)

(72) Inventors: Alan Carter, Swindon (GB); Stephen Whittaker, Newbury (GB); Aminu Wada Maida, Swindon (GB)

(73) Assignee: Ubiquisys Limited, Swindon (GB)

( * ) Notice: Subject to any disclaimer, the term of this patent is extended or adjusted under 35 U.S.C. 154(b) by 0 days.

(21) Appl. No.: 13/705,063

(22) Filed: Dec. 4, 2012

(65) Prior Publication Data

US 2013/0165175 A1 Jun. 27, 2013

Related U.S. Application Data

(60) Division of application No. 13/214,084, filed on Aug. 19, 2011, which is a continuation of application No. 11/801,337, filed on May 8, 2007, now Pat. No. 8,032,142.

(30) Foreign Application Priority Data

Feb. 2, 2007 (GB) .................................. 0702094.4

(51) Int. Cl.
*H04B 1/00* (2006.01)
*H04B 7/00* (2006.01)
(Continued)

(52) U.S. Cl.
CPC ............ *H04W 52/04* (2013.01); *H04W 52/225* (2013.01); *H04W 52/24* (2013.01);
(Continued)

(58) Field of Classification Search
CPC ... H04W 72/04; H04W 52/146; H04W 24/10; H04W 52/04; H04W 5/143; H04W 36/00; H04W 40/00; H04W 72/00; H04W 4/22; H04W 76/007; H04W 88/06; H04W 64/00; H04W 28/04; H04W 4/16; H04W 8/18; H04W 40/244; H04W 4/12; H04W 72/005; H04W 8/04; H04W 8/06; H04W 12/02; H04W 48/12; H04W 4/08; H04W 8/26; H04B 1/00; H04B 7/00
USPC ................ 455/63.1, 444, 448, 450, 464, 522, 455/414.1, 413, 406, 415, 418, 466, 412.1, 455/404.2, 408, 416, 423, 456.2, 404.1, 455/411, 419, 420, 432.3, 445, 407, 412.2, 455/426.1, 432.2, 435.1, 453, 456.1, 456.4, 455/461, 462, 463, 517, 550.1, 554.1, 555, 455/561, 563, 566, 575.1; 370/331, 401, 370/352, 336, 353, 356, 89, 428
See application file for complete search history.

(56) References Cited

U.S. PATENT DOCUMENTS 5,546,443 A 8/1996 Raith
5,548,806 A 8/1996 Yamaguchi et al.
(Continued)

FOREIGN PATENT DOCUMENTS

CN 1264992 8/2000
CN 1567743 A 1/2005
(Continued)

OTHER PUBLICATIONS

International Search Report dated Jun. 19, 2008 from corresponding International Application No. PCT/GB2008/000339.
(Continued)

*Primary Examiner* — Inder Mehra
(74) *Attorney, Agent, or Firm* — Weaver Austin Villeneuve & Sampson LLP

(57) ABSTRACT

There is described a method of controlling a basestation in a cellular wireless communications network, the method comprising, within the basestation, autonomously and dynamically adapting a maximum value for a total transmit power of the basestation, such that interference between the basestation and other access points in the vicinity is minimized.

32 Claims, 8 Drawing Sheets

(51) Int. Cl.

| | |
|---|---|
| *H04W 36/00* | (2009.01) |
| *H04W 40/00* | (2009.01) |
| *H04W 72/00* | (2009.01) |
| *H04W 52/04* | (2009.01) |
| *H04W 52/36* | (2009.01) |
| *H04W 52/24* | (2009.01) |
| *H04W 52/22* | (2009.01) |
| *H04W 52/14* | (2009.01) |
| *H04W 52/34* | (2009.01) |
| *H04W 84/04* | (2009.01) |
| *H04W 88/08* | (2009.01) |
| *H04W 24/02* | (2009.01) |

(52) U.S. Cl.
CPC .......... *H04W52/346* (2013.01); *H04W 52/367* (2013.01); *H04W 24/02* (2013.01); *H04W 52/143* (2013.01); *H04W 52/146* (2013.01); *H04W 52/343* (2013.01); *H04W 84/045* (2013.01); *H04W 88/08* (2013.01)

(56) References Cited

U.S. PATENT DOCUMENTS

| | | |
|---|---|---|
| 5,604,730 A | 2/1997 | Tiedemann, Jr. |
| 5,625,672 A | 4/1997 | Yamada |
| 5,666,655 A | 9/1997 | Ishikawa et al. |
| 5,883,884 A * | 3/1999 | Atkinson ............... 370/279 |
| 6,078,821 A | 6/2000 | Kaschke et al. |
| 6,085,106 A | 7/2000 | Sendonaris et al. |
| 6,301,478 B1 | 10/2001 | Wallstedt et al. |
| 6,314,294 B1 | 11/2001 | Benveniste |
| 6,405,048 B1 * | 6/2002 | Haartsen ............... 455/464 |
| 6,438,379 B1 | 8/2002 | Gitlin et al. |
| 6,493,331 B1 | 12/2002 | Walton et al. |
| 6,553,235 B2 | 4/2003 | Bark |
| 6,799,044 B1 | 9/2004 | Wesby et al. |
| 6,957,087 B1 | 10/2005 | Hedberg |
| 6,990,348 B1 | 1/2006 | Benveniste |
| 8,032,142 B2 | 10/2011 | Carter et al. |
| 8,463,281 B2 | 6/2013 | Maida et al. |
| 8,731,598 B2 | 5/2014 | Carter et al. |
| 8,798,545 B2 | 8/2014 | Carter |
| 8,812,047 B2 | 8/2014 | Carter et al. |
| 2002/0077138 A1 | 6/2002 | Bark et al. |
| 2002/0082023 A1 | 6/2002 | Bark |
| 2002/0119796 A1 | 8/2002 | Vanghi |
| 2003/0109284 A1 | 6/2003 | Akerberg |
| 2003/0133409 A1 | 7/2003 | Corazza |
| 2004/0192279 A1 | 9/2004 | Backes et al. |
| 2004/0224692 A1 * | 11/2004 | Hamabe ............... 455/442 |
| 2004/0236547 A1 | 11/2004 | Rappaport et al. |
| 2005/0003846 A1 | 1/2005 | Anderson |
| 2005/0037763 A1 | 2/2005 | Hamamoto et al. |
| 2005/0180351 A1 | 8/2005 | Peric |
| 2005/0265288 A1 | 12/2005 | Liu et al. |
| 2006/0019665 A1 * | 1/2006 | Aghvami et al. ............. 455/444 |
| 2006/0025136 A1 | 2/2006 | Fujita et al. |
| 2006/0084427 A1 * | 4/2006 | Kurose ............... 455/423 |
| 2006/0183495 A1 | 8/2006 | Solimon |
| 2006/0223546 A1 | 10/2006 | Claussen |
| 2006/0281412 A1 | 12/2006 | Skafidas et al. |
| 2007/0042799 A1 | 2/2007 | Jubin et al. |
| 2007/0076650 A1 | 4/2007 | Manjeshwar et al. |
| 2007/0077929 A1 | 4/2007 | Chen |
| 2007/0082619 A1 | 4/2007 | Zhang et al. |
| 2007/0097939 A1 | 5/2007 | Nylander et al. |
| 2007/0099633 A1 | 5/2007 | Bamberger et al. |
| 2007/0104085 A1 | 5/2007 | Sambhwani et al. |
| 2007/0225029 A1 | 9/2007 | Abusch-Madger |
| 2007/0293260 A1 * | 12/2007 | Xiao et al. ............... 455/522 |
| 2008/0037439 A1 | 2/2008 | Cave et al. |
| 2008/0039129 A1 * | 2/2008 | Li et al. ............... 455/522 |
| 2008/0146154 A1 * | 6/2008 | Claussen et al. ............ 455/63.1 |
| 2008/0151840 A1 | 6/2008 | Baker et al. |
| 2008/0153497 A1 | 6/2008 | Kalhan |
| 2008/0188260 A1 | 8/2008 | Xiao et al. |
| 2008/0188265 A1 | 8/2008 | Carter et al. |
| 2009/0042596 A1 | 2/2009 | Yavuz et al. |
| 2009/0052403 A1 | 2/2009 | Hokao |
| 2009/0129291 A1 | 5/2009 | Gupta |
| 2009/0233616 A1 | 9/2009 | Kwon et al. |
| 2009/0316585 A1 | 12/2009 | Srinivasan et al. |
| 2010/0035647 A1 | 2/2010 | Gholmieh et al. |
| 2010/0124930 A1 | 5/2010 | Andrews et al. |
| 2010/0182984 A1 | 7/2010 | Herscovici et al. |
| 2010/0189084 A1 * | 7/2010 | Chen et al. ............... 370/338 |
| 2011/0009065 A1 | 1/2011 | Carter |
| 2011/0039570 A1 | 2/2011 | Maida et al. |
| 2011/0177838 A1 * | 7/2011 | Olszewski ............... 455/522 |
| 2011/0237244 A1 | 9/2011 | Hiltunen et al. |
| 2012/0046055 A1 | 2/2012 | Carter et al. |
| 2013/0165176 A1 | 6/2013 | Carter et al. |
| 2014/0011489 A1 | 1/2014 | Maida et al. |

FOREIGN PATENT DOCUMENTS

| | | |
|---|---|---|
| CN | 1906868 | 1/2007 |
| CN | 101141184 | 3/2008 |
| CN | 101237395 | 8/2008 |
| EP | 0717508 | 6/1996 |
| EP | 0817400 | 1/1998 |
| EP | 0865172 | 9/1998 |
| EP | 0936753 | 8/1999 |
| EP | 0973353 | 1/2000 |
| EP | 1069702 | 1/2001 |
| EP | 1189369 | 3/2002 |
| EP | 1343336 | 9/2003 |
| EP | 1414257 | 4/2004 |
| EP | 1657950 | 5/2006 |
| EP | 1694091 | 8/2006 |
| EP | 1780904 | 5/2007 |
| EP | 1796291 | 6/2007 |
| EP | 1895714 | 3/2008 |
| EP | 1912345 | 4/2008 |
| EP | 1912458 | 4/2008 |
| EP | 1887709 | 7/2008 |
| EP | 2095531 | 9/2009 |
| EP | 2239875 | 10/2010 |
| GB | 2260879 | 4/1993 |
| GB | 2318483 | 4/1998 |
| GB | 2359452 | 8/2001 |
| GB | 2370729 | 7/2002 |
| GB | 2378089 | 1/2003 |
| GB | 2390953 | 1/2004 |
| GB | 2412541 | 9/2005 |
| GB | 2428937 | 2/2007 |
| GB | 2443865 | 5/2008 |
| GB | 2448367 | 10/2008 |
| GB | 2450123 | 12/2008 |
| GB | 2481331 | 3/2012 |
| GB | 2481544 | 3/2012 |
| GB | 2481545 | 3/2012 |
| JP | 2002/218528 | 8/2002 |
| JP | 2003/219478 | 7/2003 |
| JP | A 2004/266781 | 9/2004 |
| JP | A 2006/135673 | 5/2006 |
| JP | A 2006/222560 | 8/2006 |
| JP | 2006/527943 | 12/2006 |
| WO | WO 95/09513 | 4/1995 |
| WO | WO 95/95513 | 4/1995 |
| WO | WO 96/31075 | 10/1996 |
| WO | WO 97/11567 | 3/1997 |
| WO | WO 98/09465 | 3/1998 |
| WO | WO 98/59435 | 12/1998 |
| WO | WO 99/00914 | 1/1999 |
| WO | WO 99/34531 | 7/1999 |
| WO | WO 01/08322 | 2/2001 |
| WO | WO 01/52580 | 7/2001 |
| WO | WO 01/78327 | 10/2001 |
| WO | WO 02/054604 | 7/2002 |
| WO | WO 03/096570 | 11/2003 |
| WO | WO 03/101134 | 12/2003 |
| WO | WO 2005/046259 | 5/2005 |

(56) References Cited

FOREIGN PATENT DOCUMENTS

| WO | WO 2005/069519 | 7/2005 |
|---|---|---|
| WO | WO 2006/010958 | 2/2006 |
| WO | WO 2006/083152 | 8/2006 |
| WO | WO 2006/107555 | 10/2006 |
| WO | WO 2007/015066 | 2/2007 |
| WO | WO 2007/040453 | 4/2007 |
| WO | WO 2007/044281 | 4/2007 |
| WO | WO 2007/051189 | 5/2007 |
| WO | WO 2008/082587 | 7/2008 |
| WO | WO 2008/093100 | 8/2008 |
| WO | WO 2009/023587 | 2/2009 |

OTHER PUBLICATIONS

International Search Report dated Nov. 28, 2008 from corresponding International Application No. PCT/GB2008/000339.
Notice of Allowance dated Sep. 27, 2013 for U.S. Appl. No. 12/822,354.
U.S. Notice of Allowance dated May 31, 2011 in U.S. Appl. No. 11/801,337.
U.S. Office Action dated Aug. 23, 2010 in U.S. Appl. No. 11/801,337.
U.S. Office Action dated Feb. 7, 2013 for U.S. Appl. No. 13/214,084.
U.S. Appl. No. 13/706,263.
Preliminary Amendment dated Feb. 13, 2013, in U.S. Appl. No. 13/706,263.
U.S. Office Action dated Feb. 7, 2012 in U.S. Appl. No. 12/822,354.
U.S. Office Action dated Sep. 26, 2012 in U.S. Appl. No. 12/822,354.
U.S. Office Action dated May 1, 2013 in U.S. Appl. No. 12/822,354.
Non-final Office Action dated Sep. 5, 2012 in U.S. Appl. No. 12/820,995.
Notice of Allowance dated Dec. 28, 2012 in U.S. Appl. No. 12/820,995.
U.S. Appl. No. 13/725,665.
U.K. Search Report dated Jun. 11, 2007 in GB Application No. 0702094.4.
U.K. Search Report dated Nov. 27, 2007 for U.K. Patent Application No. GB0702094.4, Access Point Power Control, 3 pages.
U.K. Search Report dated Nov. 30, 2007 for U.K. Patent Application No. GB0702094.4, Access Point Power Control, 3 pages.
U.K. Search Report dated Dec. 4, 2007 for U.K. Patent Application No. GB0702094.4, Access Point Power Control, 3 pages.
PCT International Search Report dated Jun. 19, 2008 from corresponding International Application No. PCT/GB2008/000339.
PCT International Search Report dated Nov. 28, 2008 from corresponding International Application No. PCT/GB2008/000339.
Combined Search and Examination Report dated Oct. 26, 2011, GB Application No. GB1115805.2.
Combined Search and Examination Report dated Oct. 26, 2011, GB Application No. GB1115809.4.
Combined Search and Examination Report dated Oct. 26, 2011, GB Application No. GB1115813.6.
EP Examination Report dated Dec. 20, 2011, GB Application No. GB1115805.2.
EP Examination Report dated Dec. 20, 2011, GB Application No. GB1115809.4.
EP Examination Report dated Dec. 20, 2011, GB Application No. GB1115813.6.
PCT International Search Report and Written Opinion dated Aug. 6, 2010 issued in PCT Application No. PCT/GB2010/050695.
PCT International Search Report and Written Opinion dated Aug. 31, 2010 issued in PCT Application No. PCT/GB2010/050680.
EP Second Examination Report dated Nov. 26, 2012 in Application No. 10720945.4.
CN Office Action dated May 3, 2012 for CN Application No. 200880010581.X.
CN Office Action dated Mar. 25, 2013 for CN Application No. 200880010581.X.
Notice of Allowance dated Mar. 4, 2014 issued in U.S. Appl. No. 13/214,084.
Office Action dated Dec. 4, 2013 issued in U.S. Appl. No. 13/706,263.
Notice of Allowance dated Mar. 21, 2013 for U.S. Appl. No. 12/820,995.
CN Office Action dated Jan. 6, 2014 for CN Application No. 201080030604.0.
EP Office Action dated Jul. 28, 2011 for EP Application No. 08702006.1.
EP Office Action dated Jul. 23, 2013 for EP Application No. 08702006.1.
EP Office Action dated Jan. 21, 2014 for EP Application No. 08702006.1.
JP Office Action dated Aug. 31, 2012, JP Application No. 2009-547759.
RU Office Action dated Dec. 26, 2013 for RU Application No. 2012108046/07.
UK Combined Search and Examination Report dated Apr. 4, 2012, Application No. GB1203240.5.
UK Examination Report dated Dec. 13, 2010, issued in GB0702094.4.
UK Search Report dated Aug. 20, 2009 issued in GB09117741.4.
UK Search Report dated Nov. 11, 2009 issued in GB0914026.0.
Final Office Action dated Oct. 15, 2013 for U.S. Appl. No. 13/214,084.
EP Search Report dated Nov. 28, 2013 for EP Application No. 13179530.4.
EP Search Report dated Nov. 27, 2013 for EP Application No. 13179529.6.
EP Search Report dated Nov. 27, 2013 for EP Application No. 13179527.0.
Notice of Allowance dated Apr. 25, 2014 for U.S. Appl. No. 13/706,263.
Notice of Allowance dated May 12, 2014 for U.S. Appl. No. 12/822,354.
CN Office Action dated Feb. 25, 2014 for CN Application No. 201080035865.1.
JP Office Action dated Apr. 4, 2014 for JP Application No. 2012-519058.
JP Office Action dated Apr. 4, 2014 for JP Application No. 2012-524280.
Non-final Office Action dated May 29, 2014, U.S. Appl. No. 13/725,665.
Final Office Action dated Oct. 20, 2014, U.S. Appl. No. 13/725,665.
Notice of Allowance dated Jun. 5, 2015 in U.S. Appl. No. 13/725,665.

* cited by examiner

ACCESS POINT POWER CONTROL

This divisional application claims priority to U.S. patent application Ser. No. 13/214,084, filed on Aug. 19, 2011, and entitled ACCESS POINT POWER CONTROL, which is a continuation of U.S. patent application Ser. No. 11/801,337, filed on May 8, 2007, now U.S. Pat. No. 8,032,142, issued on Oct. 4, 2011, and entitled "ACCESS POINT POWER CONTROL", which is hereby incorporated by reference and for all purposes.

This invention relates to an access point, acting as a basestation in a cellular wireless communications network, and in particular to such an access point, in which maximum transmit power levels of the access point are controlled in such a way as to avoid interference while ensuring acceptable coverage.

In conventional cellular networks, basestations are installed by the network operators, in order to provide coverage for the areas where the network operators expect there to be a demand for their services. The network planners are able to choose the locations of the basestations, and are able to set the maximum transmit powers, of the basestation itself and of the mobile devices that establish connections with the basestation, in order to ensure a certain coverage and Quality of Service (QoS). To achieve these aims, the process requires detailed site surveys and geographical planning. When a maximum transmit power has been set, this effectively sets the size of the cell served by the basestation, because it determines the range over which the transmissions from the basestation can successfully be received. The maximum transmit power is rarely changed after it has initially been set, but can be altered from the network if necessary, for example because of changes to the radio network.

When a maximum transmit power has been set for the basestation, and calls are in progress, power control is also applied to the transmissions within these calls. Firstly, an initial transmit power is set, for example based on the power of a received access request, and thereafter power control is applied to the transmissions, based on signal strength measurements made by the mobile device involved in the call and reported back to the basestation. Such power control can operate very quickly. For example, the power level used by a basestation for its transmissions can be adapted at a frequency in the kilohertz region. That is, the power level can in theory change many times per second if the signal strength measurements indicate this.

In the case of access points (also known as femtocell basestations), these are intended to be available for purchase by consumers themselves for location within a home or office, and are intended to provide cellular coverage over relatively small geographical areas, for example only within the building in which they are located. For such devices, costly site surveys and detailed radio network planning are not possible. It is therefore proposed that such devices should be able to configure themselves, based on the local radio environment.

U.S. Pat. No. 6,314,294 relates to a basestation, in which RF transmit power levels are self calibrated, using data collected by the wireless system.

According to a first aspect of the present invention, there is provided method of controlling a basestation in a cellular wireless communications network, the method comprising:
within the basestation, autonomously and dynamically adapting a maximum value for a total transmit power of the basestation.

According to a second aspect of the present invention, there is provided a basestation adapted to perform the method according to the first aspect of the invention.

This has the effect that the basestation can configure itself, based on the local radio environment, with reduced network involvement.

For a better understanding of the present invention, and to show how it may be put into effect, reference will now be made, by way of example, to the accompanying drawings, in which.

Figure 1:
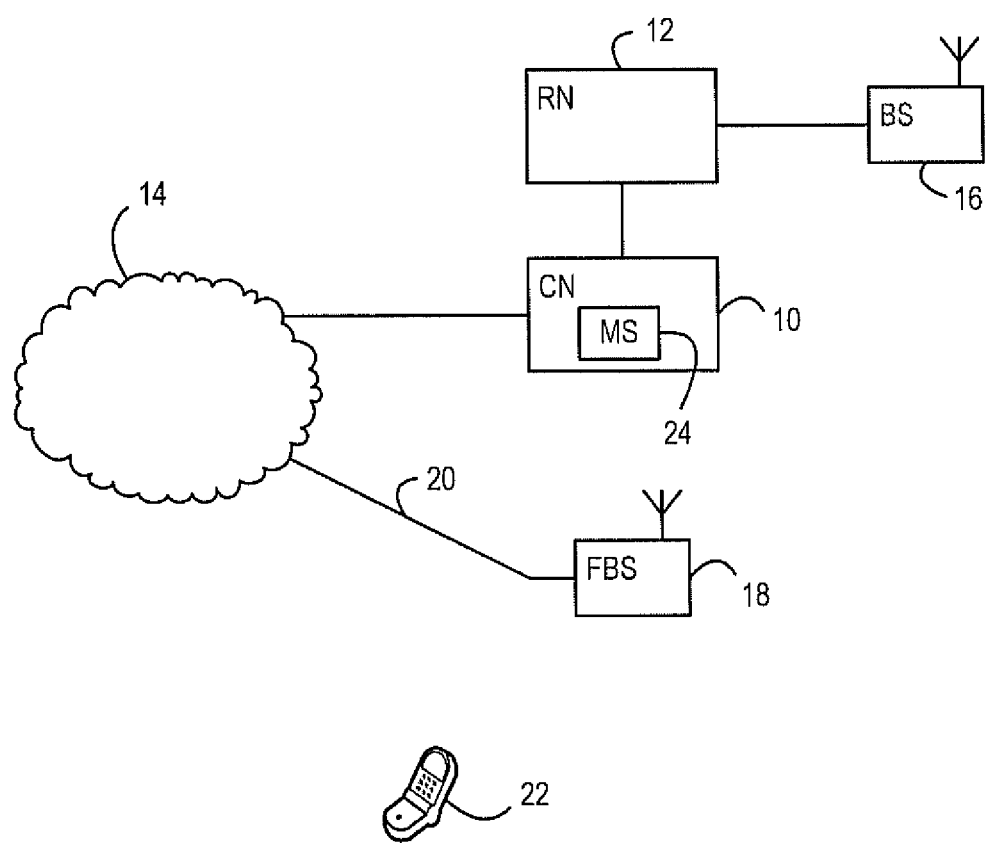
FIG. 1 is a block schematic diagram of a part of a cellular wireless communications network.

FIG. 1 illustrates a part of a cellular wireless communications network in accordance with an aspect of the present invention. Specifically, FIG. 1 shows a core network (CN) 10 and a radio network (RN) 12 of a cellular wireless communications network. These are generally conventional, and are illustrated and described herein only to the limited extent necessary for an understanding of the present invention.

Thus, the core network 10 has connections into the Public Switched Telephone Network (PSTN) (not shown) and into a packet data network, for example the internet 14. The radio network 12 may include, for example, a GSM radio network and/or a UMTS radio network, which are then generally conventional. As shown in FIG. 1, the radio network 12 has a basestation (BS) 16 connected thereto. As will be recognized by the person skilled in the art, a typical radio network 12 will have many such basestations connected thereto. These basestations provide coverage over respective geographic areas, or cells, such that a service is available to subscribers. Often, there is a group of basestations that together provide coverage to the whole of the intended service area, while other basestations provide additional coverage to smaller areas within that intended service area, in particular to smaller areas where there is expected to be more demand for the service. The cells served by the basestations of the first group are then referred to as macrocells, while the smaller areas served by the additional basestations are referred to as microcells.

FIG. 1 also shows an additional basestation 18 that can be used to provide coverage over a very small area, for example within a single home or office building. This is referred to as a femtocell basestation (FBS). The femtocell basestation 18 is connected into the mobile network operator's core network 10 over the internet 14, by means of the customer's existing broadband internet connection 20. Thus, a user of a conventional mobile phone 22 can establish a connection through the femtocell basestation 18 with another device, in the same way that any other mobile phone can establish a connection through one of the other basestations of the mobile network operator's network, such as the basestation 16.

The core network 10 includes a management system (MS) 24 that provides information to the FBS 18, as described in more detail below.

As mentioned above, the macrocell basestations provide coverage to the whole of the intended service area including the location of the femtocell basestation 18 and the location of the mobile phone 22 while it is in the coverage area of the femtocell basestation 18. However, the network is configured such that, when a mobile device that is registered with the femtocell basestation 18 is within the coverage area of the femtocell basestation 18, then it will preferentially establish a connection with the femtocell basestation 18 rather than with the macrolayer basestation 16.

When the femtocell basestation 18 is first powered on, it selects a carrier frequency and a scrambling code, from lists provided to it from a management system that generally controls the operation of the femtocell basestations in the network. The carrier frequencies and the scrambling codes on the list are shared with other basestations in the network, including nodeBs of the macrolayer and other femtocell basestations, and so the carrier frequency and scrambling code are chosen such that they result in the lowest interference to neighbour nodeBs of the macrolayer and neighbour femtocell basestations.

Figure 2:
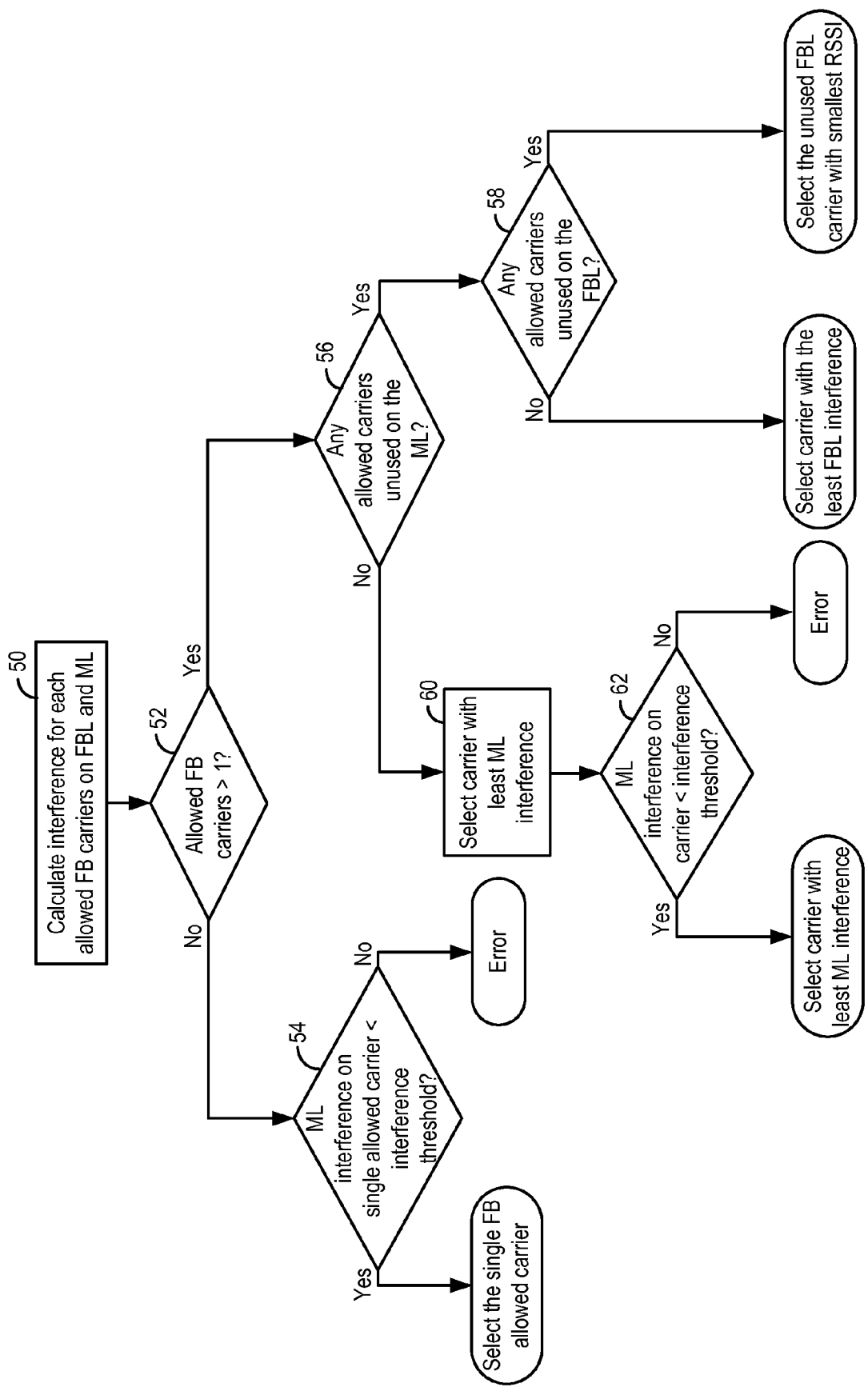
FIG. 2 is a flowchart of a carrier-selection algorithm.
Figure 3:
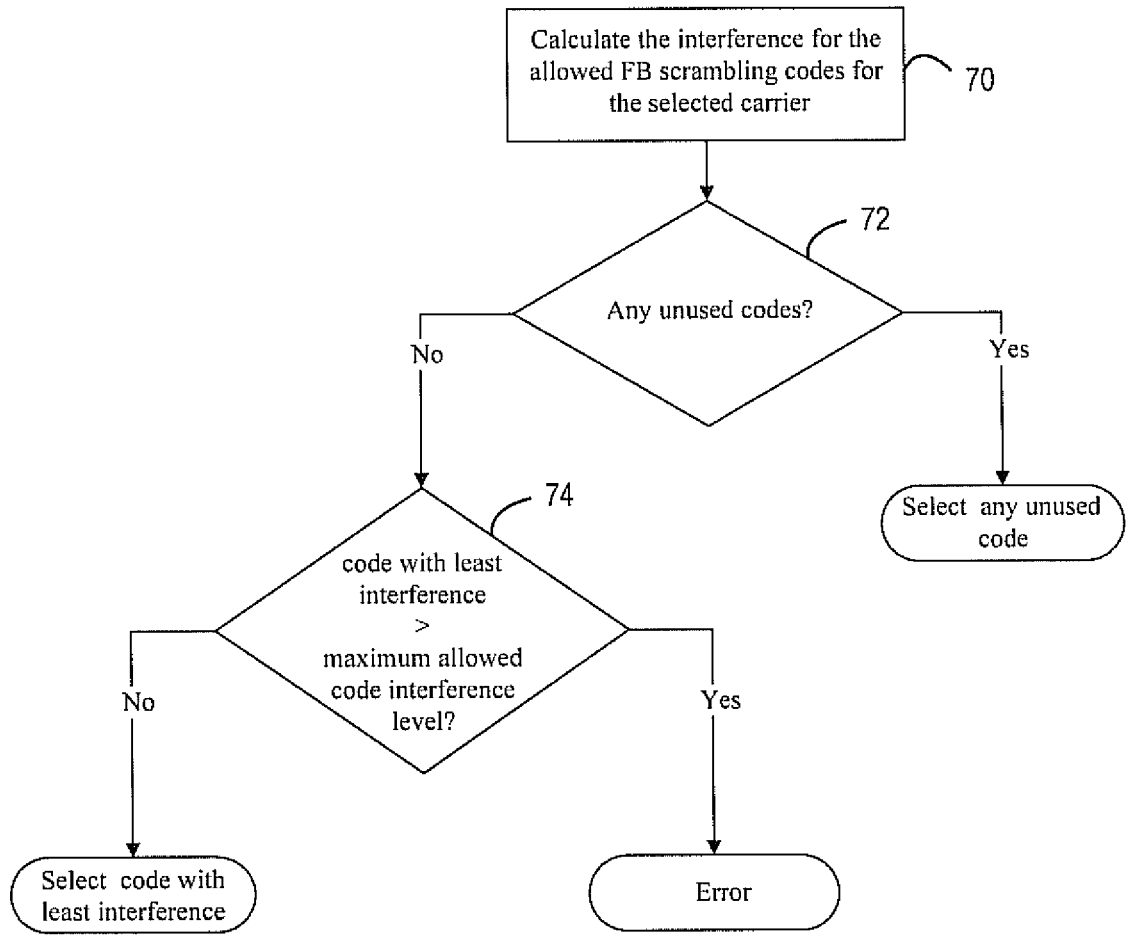
FIG. 3 is a flowchart of a scrambling code selection algorithm.

Thereafter, the basestation can autonomously and dynamically select its carrier frequency from the permitted set of carrier frequencies, and can autonomously and dynamically select its scrambling code from a permitted set of codes, in order to produce the lowest interference (see FIGS. 2 and 3).

Figure 4:
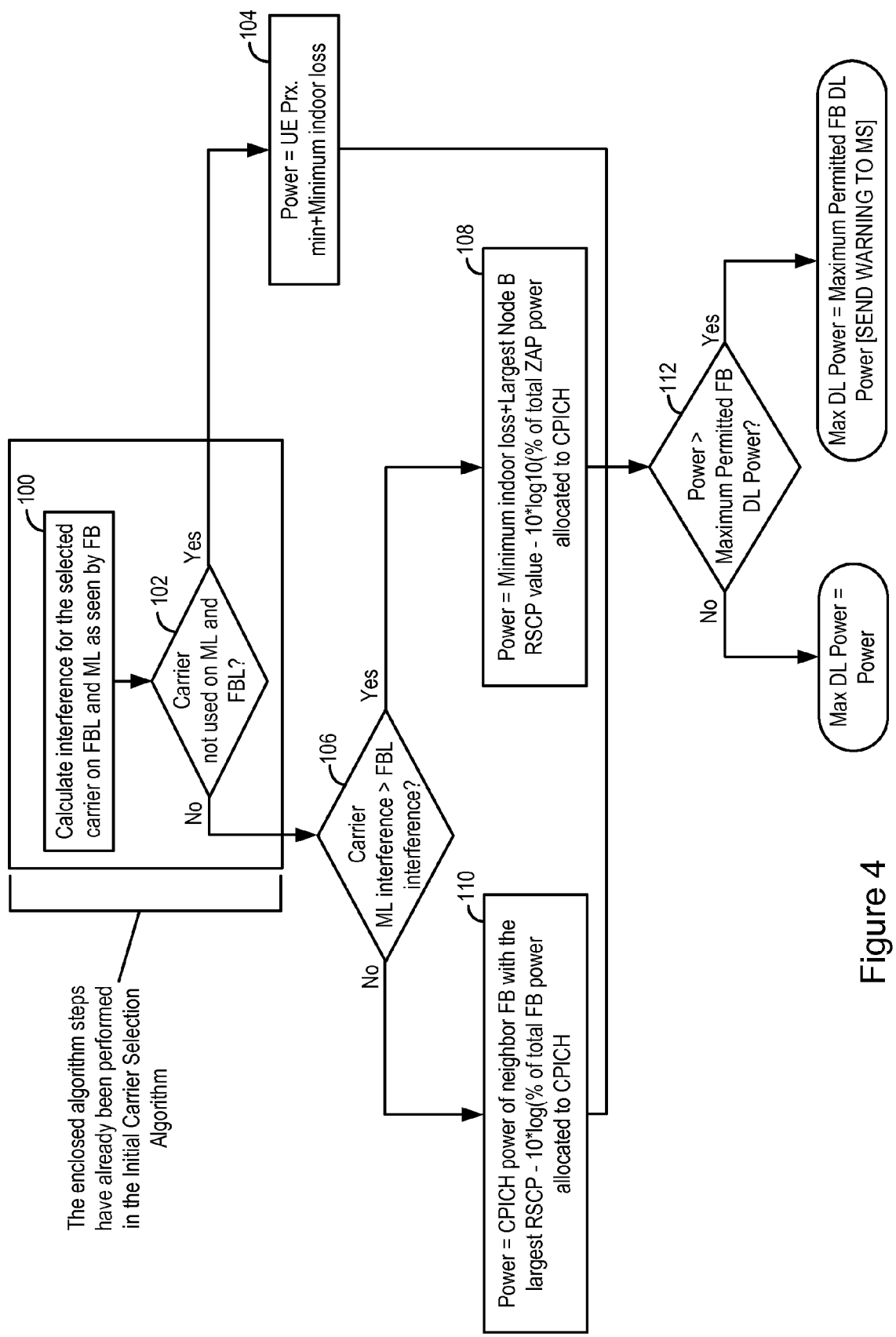
FIG. 4 is a flowchart of an algorithm for selecting the initial downlink maximum transmit power.
Figure 5:
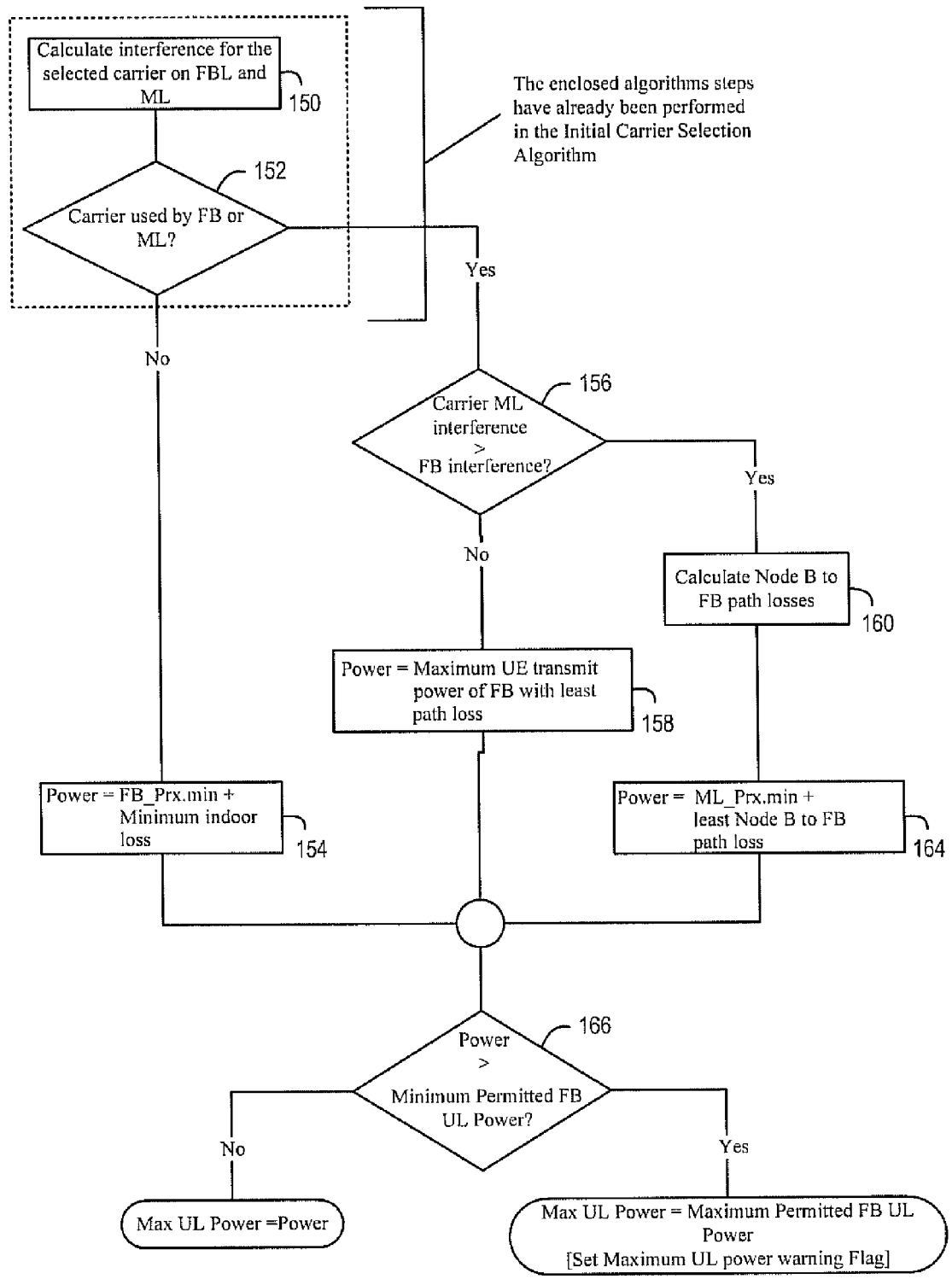
FIG. 5 is a flowchart of an algorithm for selecting the initial uplink maximum transmit power.

Also, the femtocell basestation 18 selects an initial value for the maximum total downlink power, and for total mobile transmit power levels (see FIGS. 4 and 5). This initial value can be preset in the femtocell basestation 18, based for example on an assumption about the type of location in which the device will be used. For example, it may be assumed that the device will generally be used in homes or small offices, up to a particular size (for example 90 to 250 m$^2$), and further assumptions can then be made about the signal attenuation that will result, and this can be used to determine what value should be set for the maximum total downlink power, in order to ensure a reasonable coverage throughout that area, while avoiding interference with neighbour nodeBs of the macrolayer and neighbour femtocell basestations.

Again, the femtocell basestation 18 can autonomously and dynamically adapt both its total transmit power (including the transmit power of control channels as well as traffic channels) and the total transmit power of the mobiles attached to the basestation.

It is well known that power control should be applied in a cellular communications system, so that the transmission powers in the uplink (UL) and downlink (DL) directions can be adjusted quickly, in order to take account of rapid changes that affect each communication path from the basestation to the relevant mobile device. In the UMTS system, the group of functions used to achieve this are: open-loop power control, inner-loop (or fast) PC and outer-loop power control in both UL and DL directions. Slow power control is also applied to the DL common channels. Open-loop power control is responsible for setting the initial UL and DL transmission powers when a UE is accessing the network. There are two types of inner-loop power control algorithms both of which adjust the transmission dynamically on a 1500 Hz basis. The outer-loop power control estimates the received quality and adjusts the target SIR (signal-interference ratio) for the fast closed-loop power control so that the required quality is provided.

However, in accordance with aspects of the present invention, the total transmit power of the basestation (including the transmit power of control channels as well as traffic channels) and the total transmit power of the mobiles attached to the basestation are also adaptively controlled autonomously by the basestation itself.

This control can for example take place on the basis of measurements made by the basestation itself. That is, the basestation is able to detect signals transmitted by other basestations, including macrolayer basestations and other femtocell basestations. The basestation can identify whether a detected interferer is a macrolayer basestation or a femtocell basestation based on identity information conveyed in the received broadcast channel of said interferer and RF signal measurements therefrom. Preferably, the basestation suspends its own transmissions temporarily in order to make these measurements, both when it is initially powered on, and then intermittently during operation.

Thus, at power up the RSCP (Received Signal Code Power) values can be determined for the CPICHs (Common Pilot Channels) of all surrounding femtocell basestations and macrolayer nodeBs for all available carriers. The carrier exhibiting the lowest interference is selected, where the lowest interference is defined as follows.

FIG. 2 is a flowchart showing the preferred algorithm by which the femtocell basestation may select the initial carrier.

In the first step 50, the interference is calculated for each of the allowed carriers on the macrolayer (ML) and each of the allowed carriers on the femtocell basestation layer (FBL). The macrolayer interference for each carrier is calculated by determining the macrolayer CPICH_RSCPs in milliwatts for each detected scrambling code in each carrier. These individual macrolayer CPICH_RSCPS are added together to calculate the total macrolayer interference power per carrier. This value is then converted back to dBm.

A similar method is used for determining the femtocell basestation layer interference for each carrier. The femtocell basestation layer CPICH_RSCPs are determined in milliwatts for each detected scrambling code in each carrier. These individual femtocell basestation CPICH_RSCPs are added together to calculate the total femtocell basestation interference power per carrier. This value is then converted back to dBm.

In the next step 52, it is determined whether there is more than one allowed carrier.

If there is only one allowed carrier, the process moves to step 54, that of determining whether the macrolayer interference for that carrier is below a maximum macrolayer interference threshold. If it is, the carrier is selected by the femtocell basestation. If the interference is above the threshold, an error is generated.

If there is more than one allowed carrier, the process moves to step 56, that of determining whether any of the allowed carriers on the macrolayer are currently unused. Hereinafter, a carrier is considered unused on the macrolayer if there are no detected nodeB CPICH signals and received signal strength indicator (RSSI) on the carrier is below a minimum macrolayer interference threshold.

If there are allowed carriers unused on the macrolayer, the process then determines in step 58 whether or not there are any allowed carriers on the femtocell basestation layer. Hereinafter, a carrier is considered unused on the femtocell basestation layer if there are no detected femtocell basestation CPICH signals and the RSSI on the carrier is below a minimum femtocell basestation layer interference threshold. If there are unused allowed carriers on the femtocell basestation layer, the femtocell basestation layer carrier with the lowest RSSI is chosen. If there are no unused allowed carriers on the femtocell basestation layer, the femtocell basestation layer carrier with the lowest interference (as calculated in step 50) is chosen.

In step 56, if it is determined that there are no unused carriers on the macrolayer, the process moves to step 60, where the carrier with the least macrolayer interference (as calculated in step 50) is chosen. In step 62, the macrolayer interference of this carrier is compared with a maximum macrolayer interference threshold. If the interference is below the threshold, that carrier is chosen. If the interference is above the threshold, an error is generated.

Once the carrier has been selected then, from the list of available scrambling codes, a code is selected. For example, the CPICH_RSCPs of all the available codes may be ranked, and the code with the lowest CPICH_RSCP value selected.

FIG. 3 is a flowchart showing the preferred algorithm by which the scrambling code may be selected. This algorithm will typically be applied after the carrier selection algorithm described above with reference to FIG. 2.

In step 70, the interference for each allowed scrambling code for the selected carrier is calculated. This step is performed by grouping and summing, by scrambling code, the detected femtocell basestation CPICH RSCPs for each basestation using the selected carrier.

In step 72, the process determines whether or not there are any scrambling codes that are not being used by the detected femtocell basestations. If there are any unused codes, one of these is chosen as the scrambling code. The selection of scrambling code from the list of unused codes is randomized to minimize the probability of two collocated access points selecting the same code.

If there are no unused codes the process moves to step 74, where the code with the least interference (as calculated in step 70) is selected. If the interference on this code is less than a maximum threshold, that code is chosen. If the interference is above the maximum threshold, an error is generated.

Further, the initial selection of carrier and scrambling code could be changed based on measurements from the UE. The UE may report measurements from an adjacent carrier that may indicate that the initial carrier or scrambling code were not optimal due to local shadowing of the femtocell basestation.

Following the carrier and code selection algorithms, the radio measurement data is reported back to the central management system, where it is checked against specified thresholds. If it is determined that the interference levels for the selected code/carriers exceed a predefined threshold set by the management system, and hence that the basestation is not in a location where it can perform acceptably, an error message is supplied to the user, suggesting a repositioning of the unit to a more optimal position within the home.

The initial maximum power values can then be set. If the macrolayer interference dominates, then the initial maximum Down Link transmit power is set based on the strongest macrolayer CPICH RSCP level and including a nominal in-door path loss of typically 60 dB. Alternatively, if a carrier is selected which has little or no macrolayer interference, the maximum DL transmit power is set at the same level as the neighbour femtocell basestation exhibiting the strongest CPICH RSCP level (i.e. the largest femtocell basestation interferer). This is done to maintain the same QoS for collocated femtocell basestations. If there is neither macrolayer or femtocell basestation interference, then the initial maximum DL transmit power is set according to the expected UE sensitivity (for a mid range data service) including a nominal indoor path loss of 60 dB. This is different to existing Radio Access Network (RAN) design practice, in which the maximum DL Transmit power is set by a RF planner to ensure the expected coverage.

The maximum Up Link femtocell basestation UE transmit power is firstly calculated by determining the smallest path loss to the neighbouring macrolayer nodeB, typically the closest. By summing the minimum macrolayer nodeB sensitivity with the smallest path loss, the maximum UL Tx power can be calculated. This method keeps the noise rise caused by the femtocell basestation UE below the noise caused by the macrolayer cell traffic. Likewise if no macrolayer interference is detected then the femtocell basestation sets its maximum DL transmit power at the same level as the neighbour femtocell basestation exhibiting the strongest CPICH RSCP level. If there is neither macrolayer or femtocell basestation interference then the initial UL transmit power is set according to the femtocell basestation sensitivity (for a mid range data service) and a nominal path loss of 60 dB. Again, this is quite different to existing Radio Access Network (RAN) design, in which the maximum UL Transmit power is set by a RF planner to ensure the expected coverage and UE battery life.

FIG. 4 is a flowchart showing the preferred algorithm by which the femtocell basestation may select the initial DL maximum transmit power.

In step 100, the interference is calculated for the selected carrier on the femtocell basestation layer and the macrolayer. This step will already have been performed during the carrier-selection algorithm (step 50 in FIG. 2).

In step 102, it is determined whether the selected carrier is unused on the macrolayer and the femtocell basestation layer. Again, this step will already have been performed during the carrier-selection algorithm (steps 56 and 58 in FIG. 2).

If the carrier is unused on the macrolayer and the femtocell basestation layer, the initial DL maximum transmit power is set at $UE_{Prx, min}$, the average minimum signal power required by a femtocell basestation UE to support a particular data or speech service, plus the minimum indoor loss, a parameter corresponding to the allowed indoor path loss that will provide the required coverage (step 104). The minimum indoor loss is supplied by a central management system.

If the selected carrier is not unused by the macrolayer or the femtocell basestation layer, the process moves to step 106 where the macrolayer interference is compared with the femtocell basestation interference for the selected carrier. If the macrolayer interference is greater, in step 108 the initial DL maximum transmit power is set at the minimum indoor loss (as described above), plus the RSCP value of the nodeB with the largest detected RSCP, minus $10 \times \log_{10}$(percentage of the total femtocell basestation power allocated to CPICH).

The percentage of the total downlink transmission power allocated to the CPICH is a parameter supplied by the central management system.

If, in step 106, it is determined that the femtocell basestation interference is greater than the macrolayer interference, the initial DL maximum transmit power is set in step 110 at the CPICH power of the neighbour femtocell basestation with the largest detected RSCP value, minus $10 \times \log_{10}$(percentage of the total femtocell basestation power allocated to CPICH).

As before, the percentage of the total downlink transmission power allocated to the CPICH is a parameter supplied by the management system.

Once the initial DL maximum transmit power has been set in one of steps 104, 108 or 110, the process checks in step 112 whether the initial DL maximum transmit power is greater than or less than the maximum permitted femtocell basestation DL power (a parameter set by the management system).

If it is less than the maximum permitted power, the initial DL maximum transmit power remains at its original value. However, if the initial DL maximum transmit power is greater than the maximum permitted power, the initial DL maximum transmit power is reset at the maximum permitted power, and a warning sent to the management system. For example, a flag may be set to indicate that the initial DL maximum transmit power is less than that required to run a particular speech or data service, or that the DL power is currently at its maximum permitted level.

FIG. 5 is a flowchart showing the preferred algorithm by which the femtocell basestation may select the initial UL maximum transmit power.

Steps 150 and 152 are calculating the interference for the selected carrier on the femtocell basestation later and the macrolayer, and checking whether the selected carrier is in use on the femtocell basestation layer or the macrolayer, respectively. Both of these steps will have been carried out earlier as part of the carrier selection algorithm, and are described in more detail with reference to FIG. 2.

If the carrier is not in use on the macrolayer or the femtocell basestation layer, the initial UL maximum transmit power is set in step 154 at $FB_{Prx, min}$, the average minimum signal power required by a femtocell basestation to support a particular data or speech service, plus the minimum indoor loss, the allowed indoor path loss that will provide the required coverage.

If the carrier is in use on the femtocell basestation layer or the macrolayer, the process moves to step 156, where the macrolayer interference is compared with the femtocell basestation layer interference for the selected carrier. If the femtocell basestation interference is greater, the initial UL maximum transmit power is set in step 158 at the maximum UE transmit power of the femtocell basestation with the least path loss. This value is determined by first calculating the path losses from the femtocell basestation to the detected femtocell basestations using the following equation:

$$L_{FB-FB} = CPICH\_Tx\_Power_{FB} - CPICH\_RSCP_{FB}$$

where $CPICH\_Tx\_Power_{FB}$ is the CPICH transmitted power read from the broadcast channel of detected femtocell basestations. The maximum UE transmit power read from the broadcast channel of the neighbour femtocell basestation that has the least path loss to the femtocell basestation is then selected.

If the macrolayer interference is greater than the femtocell basestation interference for the selected carrier, the nodeB to femtocell basestation path losses are then calculated in step 160. The path losses are calculated using the following equation:

$$L_{NodeB-FB} = CPICH\_Tx\_Power_{NodeB} - CPICH\_RSCP_{NodeB}$$

where $CPICH\_Tx\_Power_{NodeB}$ is the CPICH transmitted power read from the broadcast channel of detected nodeBs.

The initial UL maximum transmit power is set in step 164 at $ML_{Prx, min}$, the average minimum signal power required by a nodeB to support a particular data or speech service, plus the RSCP value that corresponds to the least nodeB to femtocell basestation path loss.

Once the initial UL maximum transmit power has been set in one of steps 154, 158 or 164, the process moves to step 166, where the initial UL maximum transmit power is compared with the maximum permitted femtocell basestation UL power. If the UL maximum transmit power is less than the maximum permitted power, the initial UL maximum transmit power is maintained at its original level. If the UL maximum transmit power is greater than the maximum permitted power, the initial UL maximum transmit power is reset at the maximum permitted power as defined by the management system. Also, a warning is sent to the management system, that the UL power may be insufficient for certain data or speech services, or that the UL power is currently at its maximum permitted level.

During operation, the maximum DL and UL transmit powers are adapted through the regular CPICH RSCP and CPICH Ec/Io measurements reported by the femtocell basestation UEs during idle mode or RRC connected mode (CELL_DCH state). The adaptation algorithm assumes that the femtocell basestation UEs remain for the majority of the time within the expected coverage area (i.e. the house or office). The adaptation algorithm slowly increases or decreases the allowed UL and DL maximum transmit power level to ensure that the CPICH Ec/Io (or QoS) remains at a suitable level for both speech and data services. In the case that the femtocell basestation detects that there is local macrolayer interference then over a period of time it builds two sets of histograms from the femtocell basestation UE measurements of the active and neighbour cells. The first histogram is the path loss between the femtocell basestation UE and the neighbour macrolayer nodeB and the second set of histograms is the path loss between the femtocell basestation UE and the femtocell basestation and also the femtocell basestation UE CPICH Ec/Io measurements. The adaptation algorithm attempts to keep typically 90% of all femtocell basestation UE CPICH Ec/Io measurements above a particular level (e.g. −10 to −15 dB) but will only allow 1% of femtocell basestation UE to femtocell basestation path loss measurements (i.e. largest path loss) to exceed the path loss between the femtocell basestation UE and macrolayer nodeB (i.e. smallest path loss). Furthermore the adaptation algorithm will allow a maximum path femtocell basestation to femtocell basestation UE path loss of typically <90 dB for 95% of the time. By assuming that the UL and DL path loss is reciprocal, the same adaptation algorithms are used to set the maximum DL and UL transmit power levels.

The femtocell basestation may also gather UE measurements by 'sniffing' periodically (for example every 100 seconds) by stealing a down link frame.

Figure 6:
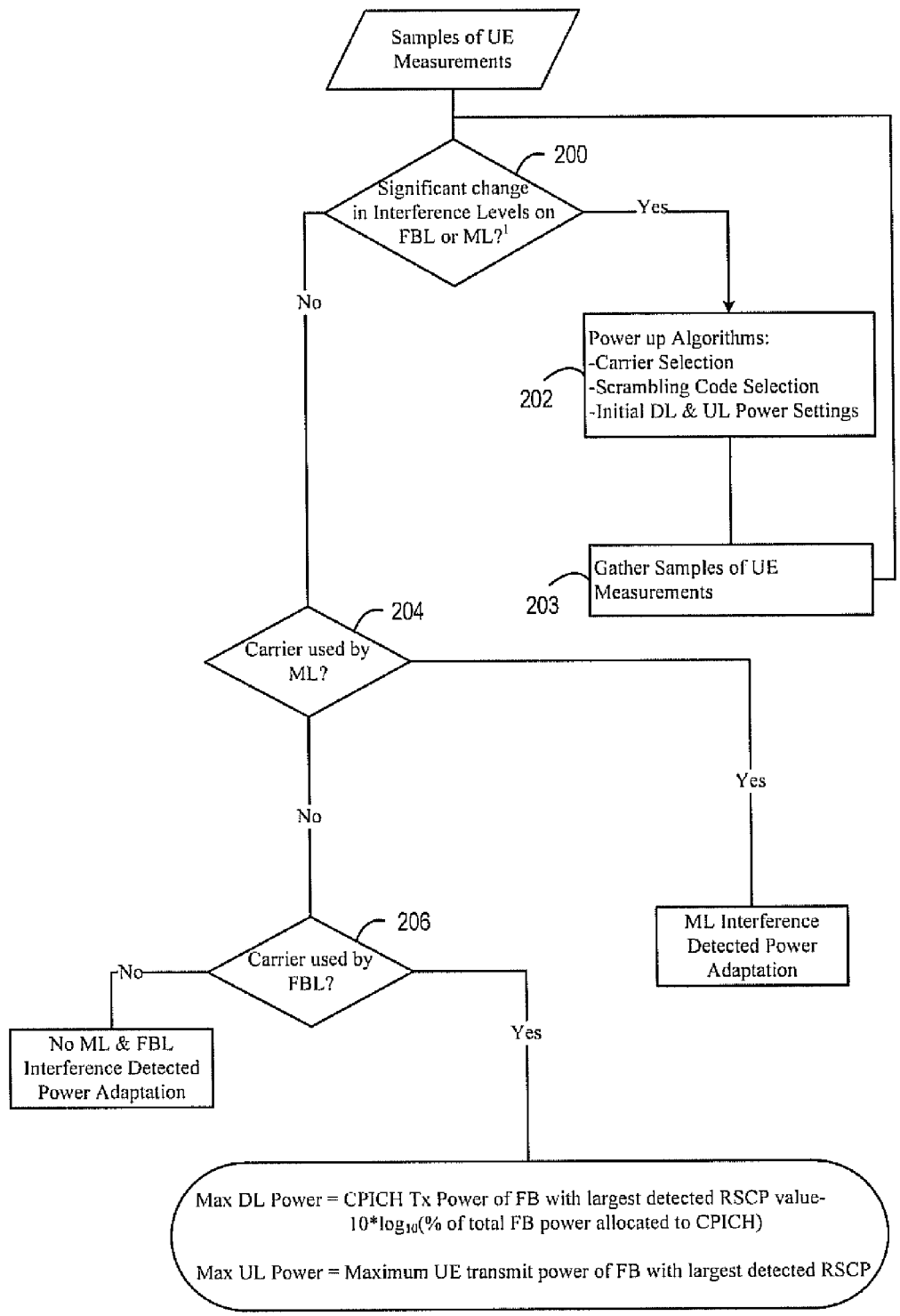
FIG. 6 is a flowchart of an algorithm for adapting the uplink and downlink maximum transmit powers.

FIG. 6 is a flowchart showing the preferred algorithm by which the femtocell basestation may dynamically adapt the UL and DL maximum transmit powers.

As described above, the femtocell basestation regularly takes UE measurements of the active and neighbour cells, and these are used as the input for adapting the maximum transmit powers. By monitoring the UE measurements, in step 200, the process first determines whether there has been a significant change on either the macrolayer or the femtocell basestation layer's interference levels for the carrier and scrambling code already selected. A significant change in this context means any change that will require a new carrier and/or scrambling code to be reselected. Therefore, if a significant change is found, the process will rerun the carrier-selection algorithm, the scrambling-code-selection algorithm and the initial power setup algorithm described with reference to FIGS. 2, 3 and 4, respectively, in step 202.

Once these "power up" algorithms have been performed, the process moves to step 203, that of re-gathering samples of UE measurements so that step 200 can be performed again for the new carrier and/or scrambling code.

If there is no significant change in the macrolayer or the femtocell basestation layer, the process determines in step 204 whether or not the carrier is used on the macrolayer. If the carrier is used on the macrolayer (i.e. interference is detected on the macrolayer), the macrolayer interference algorithm is used to adapt the power (see FIG. 7).

If the carrier is not used on the macrolayer, the process determines in step 206 whether the carrier is used on the femtocell basestation layer. If the carrier is not used on the femtocell basestation layer (i.e. there is no interference on the femtocell basestation layer) the "no interference" algorithm is used to adapt the power (see FIG. 8).

If the carrier is used on the femtocell basestation layer, the UL and DL maximum transmit powers are set as follows.

The UL maximum transmit power is set at the maximum UE transmit power of the femtocell basestation with the least path loss. This value is determined by first calculating the path losses from the femtocell basestation to the surrounding detected femtocell basestations. The maximum UE transmit power read from the broadcast channel of the surrounding femtocell basestation that has the least path loss to the femtocell basestation is then selected.

The path losses are determined, as before, by the following equation:

$$L_{FB\text{-}FB} = CPICH\_Tx\_Power_{FB} - CPICH\_RSCP_{FB}.$$

The DL maximum transmit power is set at the CPICH Tx power of the femtocell basestation with the largest detected RSCP value, minus $10 \times \log_{10}$(percentage of the total femtocell basestation power allocated to CPICH).

That is, if only interference from a neighbouring femtocell basestation is detected, the basestation uses the power of that neighbouring basestation to set its own UL and DL maximum transmit powers.

Figure 7:
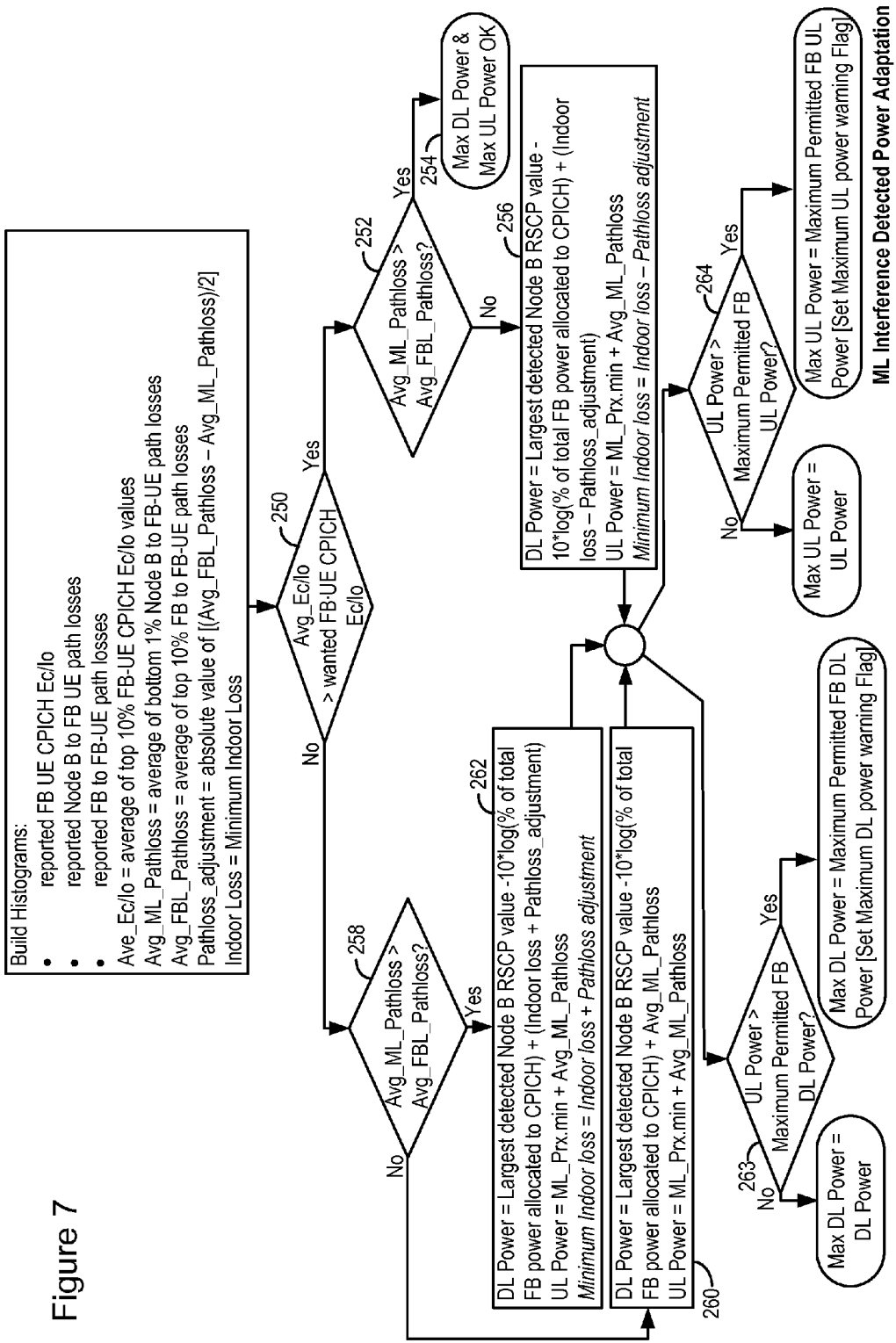
FIG. 7 is a flowchart of an algorithm for adapting the uplink and downlink maximum transmit powers in the event that macrolayer interference is detected.

FIG. 7 is a flowchart of the preferred algorithm that may be used to adapt the UL and DL maximum transmit powers in the event that macrolayer interference is detected.

As described above, histograms are produced from the UE measurements. Specifically, these are the femtocell basestation UE to neighbouring nodeB path losses, the femtocell basestation to femtocell basestation UE path losses, and the femtocell basestation UE CPICH Ec/Io measurements. From these histograms, the following quantities can be calculated:

Avg_Ec/Io=the average of the top 10% femtocell basestation UE CPICH Ec/Io values;
Avg_ML_Pathloss=the average of the bottom 1% nodeB to femtocell basestation UE path losses;
Avg_FBL_Pathloss=the average of the top 10% FB to FB UE path losses;
Pathloss_adjustment=the absolute value of [½×(Avg_FBL_Pathloss−Avg_ML_Pathloss)]

Further, a new parameter, Indoor loss, is set to the value of minimum indoor loss, initially provided by the central management system. However, minimum indoor loss is adapted as the process of DL and UL maximum power adaptation is repeated, as will be described in more detail below.

In step 250, Avg_Ec/Io is compared with the desired femtocell basestation UE CPICH Ec/Io. If Avg_Ec/Io is larger, then the process moves to step 252, which compares Avg_ML_Pathloss with Avg_FBL_Pathloss. If Avg_ML_Pathloss is greater, the UL and DL maximum transmit powers are kept at the same level (step 254).

If Avg_ML_Pathloss is smaller than Avg_FBL_Pathloss, then the UL and DL maximum transmit powers are set as follows (step 256). Maximum DL power is set at the RSCP level of the largest detected nodeB RSCP value, minus $10 \times \log_{10}$(percentage of the total femtocell basestation power allocated to CPICH), plus the indoor loss, minus Pathloss_adjustment. Maximum UL power is set at $ML_{Prx,\ min}$, the minimum signal power required by the basestation to support a particular data or speech service, plus the Avg_ML_Pathloss. Further, minimum indoor loss is re-set at the value of Indoor loss minus Pathloss_Adjustment.

If it is determined, in step 250, that Avg_Ec/Io is less than the desired femtocell basestation UE CPICH Ec/Io, the process moves to step 258, where Avg_ML_Pathloss is again compared with Avg_FBL_Pathloss.

If Avg_ML_Pathloss is smaller, the maximum DL power is set in step 260 at the RSCP value of the nodeB with the largest detected RSCP value, minus $10 \times \log_{10}$(percentage of the total femtocell basestation power allocated to CPICH), plus the Avg_ML_Pathloss. The maximum UL power is set at $ML_{Prx,\ min}$, the minimum signal power required by the basestation to support a particular data or speech service, plus the Avg_ML_Pathloss.

If Avg_ML_Pathloss is greater than Avg_FBL_Pathloss, the maximum DL power is set in step 262 at the RSCP value of the nodeB with the largest RSCP value, minus $10 \times \log_{10}$ (percentage of the total femtocell basestation power allocated to CPICH), plus the indoor loss and Pathloss_adjustment. The maximum UL power is set at $ML_{Prx,\ min}$, the minimum signal power required by a femtocell basestation to support a particular data or speech service, plus the Avg_ML_Pathloss. Further, minimum indoor loss is re-set at the value of Indoor loss plus Path loss_Adjustment.

Once the maximum DL and UL powers have been set in one of steps 256, 260 or 262, the process moves in parallel to steps 263 and 264. In step 263 the process checks whether the maximum DL power is greater than or less than the maximum permitted femtocell basestation DL power (a parameter set by the management system). If it is less than the maximum permitted power, the maximum DL power remains at its re-set value. However, if the maximum DL power is greater than the maximum permitted power, the maximum DL power is changed to the maximum permitted power, and a warning sent to the management system. For example, a flag may be set to indicate that the maximum DL power is less than that required to run a particular speech or data service.

In step 264 the process checks whether the maximum UL power is greater than or less than the maximum permitted femtocell basestation UL power (a parameter set by the management system). If it is less than the maximum permitted power, the maximum UL power remains at its re-set value. However, if the maximum UL power is greater than the maximum permitted power, the maximum UL power is changed to the maximum permitted power, and a warning sent to the management system. For example, a flag may be set to indicate that the maximum UL power is less than that required to run a particular speech or data service.

The whole process as described by FIGS. 6 and 7 repeats, adapting the maximum UL and DL powers until either an error event occurs, the powers converge to an optimal value, or the host processor identifies that there has been a significant change in the local interference levels and the carrier, scrambling code and initial UL and DL powers need to be re-evaluated.

Further, the value of minimum indoor loss is adapted as the process repeats. For example, minimum indoor loss may be set at 60 dB initially. When the process is run, it may end up at step 262. If Pathloss_Adjustment is found to be 10 dB, minimum indoor loss is reset at 70 dB, and for the next repeat of the process, indoor loss will begin at 70 dB.

Figure 8:
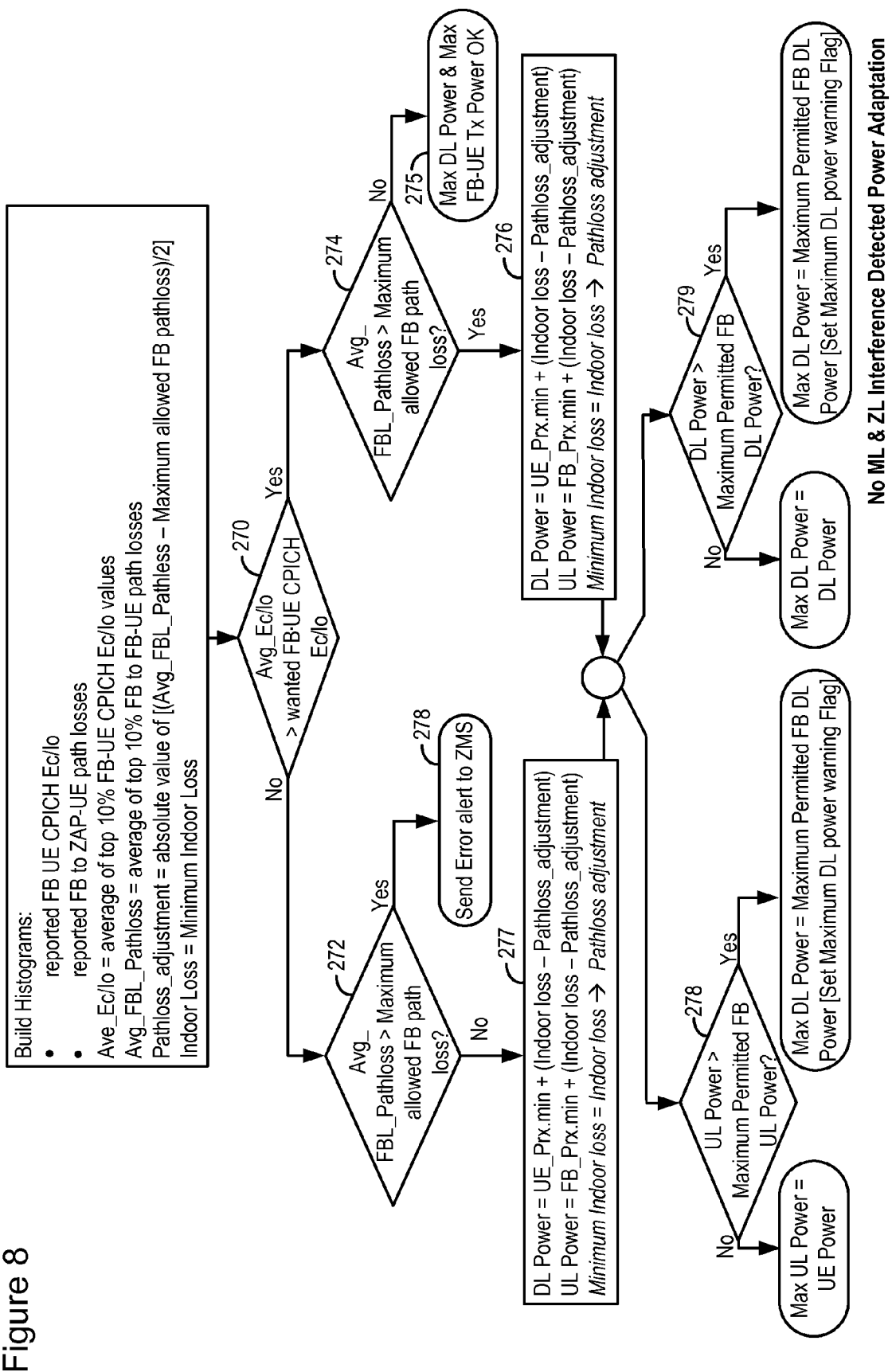
FIG. 8 is a flowchart of an algorithm for adapting the uplink and downlink maximum transmit powers in the event that no interference is detected in the macrolayer or the femtocell basestation layer.

FIG. 8 is a flowchart of the preferred algorithm that may be used to adapt the UL and DL maximum transmit powers in the event that no interference is detected from the macrolayer or the femtocell basestation layer.

As described above, histograms are produced from the UE measurements. Specifically, these are the femtocell basestation to femtocell basestation UE path losses, and the femtocell basestation UE CPICH Ec/Io measurements. From these histograms, the following quantities can be calculated:

Avg_Ec/Io=the average of the top 10% femtocell basestation UE CPICH Ec/Io values; Avg_FBL_Pathloss=the average of the top 10% FB to FB UE path losses; Pathloss_adjustment=the absolute value of [½×(Avg_FBL_Pathloss−Maximum allowed FB Pathloss)]

Maximum allowed femtocell basestation pathloss is supplied by the management system, and based on an assumed maximum indoor path loss (typically around 90 dB).

Indoor loss is set at the value of minimum indoor loss, as described with reference to FIG. 7.

In step 270, Avg_Ec/Io is compared with the desired femtocell basestation UE CPICH Ec/Io. If Avg_Ec/Io is larger, then the process moves to step 274, which compares Avg_FBL_Pathloss with the maximum allowed femtocell basestation path loss. If Avg_FBL_Pathloss is smaller, the UL and DL maximum transmit powers are kept at the same level (step 275).

If Avg_FBL_Pathloss is greater than the maximum allowed femtocell basestation path loss, then the UL and DL maximum transmit powers are set as follows (step 276). Maximum DL power is set at $UE_{Prx, min}$, plus the indoor loss, minus Pathloss_adjustment. Maximum UL power is set at $FB_{Prx, min}$, plus the indoor loss, minus Pathloss_adjustment. Minimum indoor loss is reset at indoor loss minus Pathloss_Adjustment If it is determined, in step 270, that Avg_Ec/Io is smaller than the desired femtocell basestation UE CPICH Ec/Io, the process moves to step 272, where Avg_FBL_Pathloss is again compared with the maximum allowed femtocell basestation path loss.

If Avg_FBL_Pathloss is smaller, the maximum DL power is set in step 277 at $UE_{Prx, min}$, plus the indoor loss, plus Pathloss_adjustment. Maximum UL power is set at $FB_{Prx, min}$, plus the indoor loss, plus Pathloss_adjustment. Minimum indoor loss is set at Indoor loss plus Pathloss_Adjustment.

If Avg_ML_Pathloss is greater than Avg_FBL_Pathloss, then an error alert is sent to the management system (step 278).

Once the maximum DL and UL powers have been set in step 276 or 277, the process moves in parallel to steps 278 and 279. In step 279 the process checks whether the maximum DL power is greater than or less than the maximum permitted femtocell basestation DL power (a parameter set by the management system). If it is less than the maximum permitted power, the maximum DL power remains at its re-set value. However, if the maximum DL power is greater than the maximum permitted power, the maximum DL power is changed to the maximum permitted power, and a warning sent to the management system. For example, a flag may be set to indicate that the maximum DL power is less than that required to run a particular speech or data service.

In step 279 the process checks whether the maximum UL power is greater than or less than the maximum permitted femtocell basestation UL power (a parameter set by the management system). If it is less than the maximum permitted power, the maximum UL power remains at its re-set value. However, if the maximum UL power is greater than the maximum permitted power, the maximum UL power is changed to the maximum permitted power, and a warning sent to the management system. For example, a flag may be set to indicate that the maximum UL power is less than that required to run a particular speech or data service.

The whole process as described by FIGS. 6 and 8 repeats, adapting the maximum UL and DL powers until either an error event occurs, the powers converge to an optimal value or the host processor identifies that there has been a significant change in the local interference levels and the carrier, scrambling code and initial UL and DL powers need to be re-evaluated. Again, the value of minimum indoor loss is also adapted as the process repeats.

The maximum DL transmit power will also be adapted based on reported round trip time (RTT) measurements available from the femtocell basestation and measured for each femtocell basestation UE. A histogram of the RTT measurements would be built up for all calls and the maximum DL transmit power adapted so that a predetermined number of RTT samples (typically 90%) are within the expected coverage area.

Furthermore, Random Access Channel (RACH) measurements can be used to determine at what distance from the access point a mobile is trying to set up a call. If the call set up is outside of the expected coverage area then the call can be rejected.

Error conditions such as multiple accesses from unregistered mobiles may indicate that the DL coverage is too large or that the user has positioned the femtocell basestation in a position that is causing unnecessary DL macrolayer interference (e.g. on a window overlooking the city). In this situation the maximum DL transmit power may be reduced until this error event falls below a predetermined threshold. Alternatively, the problem could be reported to the management system, which may send a message to the user requesting him to relocate the unit in a position that would cause less interference. Thus the basestation can use knowledge of access attempts by unregistered mobiles to adapt the DL and UL maximum transmit powers.

As described above, there are several ways in which error conditions can be detected, and may be reported to the management system. For example, there may be a requirement to use a particular power level, or information about a number of access attempts from mobiles that are outside the intended coverage area. These may indicate that the configuration of the basestation would cause excessive interference, or otherwise be detrimental. In each of these situations, the problem may be resolved by repositioning of the basestation, for example away from a window or towards a position nearer the centre of the intended coverage area. In response to an error condition, therefore, a message may be sent from the management system to the user of the basestation, requesting that the basestation be repositioned. The message may be displayed on the basestation itself, or sent to a device that is connected to the basestation. This repositioning can be carried out until the error condition is resolved, and therefore acts as a pseudo-closed loop control.

There are thus described methods of operation of a basestation, and basestations adapted for such uses, that allow the basestations to configure themselves for operation within the cellular network without excessive interference with each other or with other basestations in the network.

The invention claimed is:

1. A method of controlling a first basestation in a cellular wireless communications network comprising macrocell basestations and femtocell basestations, the method comprising:

running a first set of algorithms at the first basestation at power up of the first basestation, said first set of algorithms selecting a carrier, a scrambling code, and maximum total downlink power for use by the first basestation in operation;

and, in operation of the first basestation:
  obtaining measurements made by user equipment devices of signals from other basestations of said network;
  determining, from said measurements made by the user equipment devices, whether there has been a change in interference in a femtocell layer or a macrocell layer requiring a new carrier or scrambling code to be reselected;
  if there has been such a change in interference, rerunning, at the first basestation, the said first set of algorithms performed on power up for selection of a carrier, a scrambling code, and maximum total downlink power; and
  if there has not been such a change in interference, setting a maximum value for a total transmit power of the first basestation based on said measurements made by user equipment devices and based on knowledge of round trip delays for a communications path between said first basestation and a user terminal within a target coverage area, and based on a predetermined maximum permitted round-trip delay.

2. A method as claimed in claim 1, further comprising setting said maximum value for the total transmit power autonomously and dynamically within the first basestation.

3. A method as claimed in claim 1, further comprising setting said maximum value for the total transmit power based on:
  knowledge of the transmit power of, and path loss to, surrounding macrolayer basestations and other basestations, said knowledge being derived from information decoded from broadcast channel transmissions thereof and measured received signal strengths.

4. A method as claimed in claim 1, further comprising setting said maximum value for the total transmit power based on:
  knowledge of whether a measured dominant interferer is a macrolayer basestation or a nearby access point.

5. A method as claimed in claim 4, wherein said knowledge of whether a measured dominant interferer is a macrolayer basestation or a nearby access point is based on identity information conveyed in the received broadcast channel of said interferer and RF signal measurements therefrom.

6. A method as claimed in claim 1, further comprising setting said maximum value for the total transmit power based on:
  knowledge of historical statistics for the path loss between said first basestation and permitted User Equipments (UEs) in call therewith said first basestation, and based on a predetermined maximum permitted path loss figure.

7. A method as claimed in claim 1, further comprising setting said maximum value for the total transmit power based on:
  knowledge of historical statistics for a received signal/interference ratio as measured at UEs in call with the first basestation, and based on a predetermined minimum signal/interference ratio.

8. A method as claimed in claim 7, wherein measurements of said received signal/interference ratio are specifically requested by the first basestation.

9. A method as claimed in claim 1, further comprising setting said maximum value for the total transmit power based on:
  knowledge of historical statistics for a path loss between UEs in call with the first basestation and nearby nodeBs.

10. A method as claimed in claim 9, wherein measurements of said path loss are specifically requested by the first basestation.

11. A method as claimed in claim 1, further comprising setting said maximum value for the total transmit power based on:
  knowledge of access attempts by non-permitted users.

12. A method as claimed in claim 1, wherein, before the step of setting a maximum value for a total transmit power of the first basestation, there is the step of:
  determining whether or not a carrier that has been selected for communicating with UEs is unused by neighbouring macrolayer basestations or other basestations;
  wherein a carrier is unused if there are no detected macrolayer basestation or other basestation CPICH signals and the received signal strength indicator (RSSI) on the carrier is below a minimum interference threshold.

13. A method as claimed in claim 12, further comprising the step of:
  if the carrier is not unused by neighbouring macrolayer basestations or other basestations, determining whether the interference caused by neighbouring macrolayer basestations is greater than or less than the interference caused by neighbouring other basestations.

14. A method as claimed in claim 13, said setting step comprising:
  if said carrier is unused by neighbouring macrolayer basestations or other basestations, setting the total transmit power of the first basestation at a first level;
  if said carrier is not unused by neighbouring macrolayer basestations or other basestations, and the interference caused by neighbouring macrolayer basestations is greater than the interference caused by neighbouring other basestations, setting the total transmit power of the first basestation at a second level; and
  if said carrier is not unused by neighbouring macrolayer basestations or other basestations, and the interference caused by neighbouring macrolayer basestations is less than the interference caused by neighbouring other basestations, setting the total transmit power of the first basestation at a third level.

15. A method as claimed in claim 14, further comprising:
  determining whether said first, second or third levels are greater than a maximum permitted power threshold; and
  if said first, second or third levels are greater than a maximum permitted power threshold, resetting the total transmit power of the basestation to said maximum permitted power threshold; and
  if said first, second or third levels are not greater than a maximum permitted power threshold, maintaining the total transmit power of the basestation at its set level.

16. A basestation adapted to perform a method of controlling the basestation in a cellular wireless communications network comprising macrocell basestations and femtocell basestations, the method comprising:
  running a first set of algorithms at the basestation at power up of the first basestation, said first set of algorithms selecting a carrier, a scrambling code, and maximum total downlink power for use by the first basestation in operation;
  and, in operation of the first basestation:
    obtaining measurements made by user equipment devices of signals from other basestations of said network;
    determining, from said measurements made by the user equipment devices, whether there has been a change in interference in a femtocell layer or a macrocell layer requiring a new carrier or scrambling code to be reselected;

if there has been such a change in interference, rerunning, at the basestation, the said first set of algorithms performed on power up for selection of a carrier, a scrambling code, and maximum total downlink power; and if there has not been such a change in interference, setting a maximum value for a total transmit power of the basestation based on said measurements made by user equipment devices and based on knowledge of access attempts by non-permitted users.

17. The basestation as claimed in claim 16, the method further comprising setting said maximum value for the total transmit power autonomously and dynamically within the basestation.

18. The basestation as claimed in claim 16, the method further comprising setting said maximum value for the total transmit power based on:

knowledge of the transmit power of, and path loss to, surrounding macrolayer basestations and other basestations, said knowledge being derived from information decoded from broadcast channel transmissions thereof and measured received signal strengths.

19. The basestation as claimed in claim 16, the method further comprising setting said maximum value for the total transmit power based on:

knowledge of whether a measured dominant interferer is a macrolayer basestation or a nearby access point.

20. The basestation as claimed in claim 19, wherein said knowledge of whether a measured dominant interferer is a macrolayer basestation or a nearby access point is based on identity information conveyed in the received broadcast channel of said interferer and RF signal measurements therefrom.

21. The basestation as claimed in claim 16, the method further comprising setting said maximum value for the total transmit power based on:

knowledge of historical statistics for the path loss between said basestation and permitted User Equipments (UEs) in call therewith said basestation, and based on a predetermined maximum permitted path loss figure.

22. The basestation as claimed in claim 16, the method further comprising setting said maximum value for the total transmit power based on:

knowledge of historical statistics for a received signal/interference ratio as measured at UEs in call with the basestation, and based on a predetermined minimum signal/interference ratio.

23. The basestation as claimed in claim 22, wherein measurements of said received signal/interference ratio are specifically requested by the basestation.

24. The basestation as claimed in claim 16, the method further comprising setting said maximum value for the total transmit power based on:

knowledge of historical statistics for a path loss between UEs in call with the basestation and nearby nodeBs.

25. The basestation as claimed in claim 24, wherein measurements of said path loss are specifically requested by the basestation.

26. The basestation as claimed in claim 16, the method further comprising setting said maximum value for the total transmit power based on:

knowledge of round trip delays for a communications path between said basestation and a user terminal within a target coverage area, and based on a predetermined maximum permitted round-trip delay.

27. The basestation as claimed in claim 16, wherein, before the step of setting a maximum value for a total transmit power of the basestation, there is the step of:

determining whether or not a carrier that has been selected for communicating with UEs is unused by neighbouring macrolayer basestations or other basestations;

wherein a carrier is unused if there are no detected macrolayer basestation or other basestation CPICH signals and the received signal strength indicator (RSSI) on the carrier is below a minimum interference threshold.

28. The basestation as claimed in claim 27, the method further comprising the step of:

if the carrier is not unused by neighbouring macrolayer basestations or other basestations, determining whether the interference caused by neighbouring macrolayer basestations is greater than or less than the interference caused by neighbouring other basestations.

29. The basestation as claimed in claim 28, said setting step comprising:

if said carrier is unused by neighbouring macrolayer basestations or other basestations, setting the total transmit power of the basestation at a first level;

if said carrier is not unused by neighbouring macrolayer basestations or other basestations, and the interference caused by neighbouring macrolayer basestations is greater than the interference caused by neighbouring other basestations, setting the total transmit power of the basestation at a second level; and if said carrier is not unused by neighbouring macrolayer basestations or other basestations, and the interference caused by neighbouring macrolayer basestations is less than the interference caused by neighbouring other basestations, setting the total transmit power of the basestation at a third level.

30. The basestation as claimed in claim 29, the method further comprising:

determining whether said first, second or third levels are greater than a maximum permitted power threshold; and if said first, second or third levels are greater than a maximum permitted power threshold, resetting the total transmit power of the basestation to said maximum permitted power threshold; and if said first, second or third levels are not greater than a maximum permitted power threshold, maintaining the total transmit power of the basestation at its set level.

31. A method of controlling a first basestation in a cellular wireless communications network comprising macrocell basestations and femtocell basestations, the method comprising:

running a first set of algorithms at the first basestation at power up of the first basestation, said first set of algorithms selecting a carrier, a scrambling code, and maximum total downlink power for use by the first basestation in operation;

and, in operation of the first basestation:

obtaining measurements made by user equipment devices of signals from other basestations of said network;

determining, from said measurements made by the user equipment devices, whether there has been a change in interference in a femtocell layer or a macrocell layer requiring a new carrier or scrambling code to be reselected;

if there has been such a change in interference, rerunning, at the first basestation, the said first set of algorithms performed on power up for selection of a carrier, a scrambling code, and maximum total downlink power; and if there has not been such a change in interference, setting a maximum value for a total transmit power of the first basestation based on said measurements made by user equipment devices and based on knowledge of access attempts by non-permitted users.

32. A basestation adapted to perform a method of controlling the basestation in a cellular wireless communications network comprising macrocell basestations and femtocell basestations, the method comprising:

running a first set of algorithms at the basestation at power up of the first basestation, said first set of algorithms selecting a carrier, a scrambling code, and maximum total downlink power for use by the first basestation in operation;

and, in operation of the first basestation:

obtaining measurements made by user equipment devices of signals from other basestations of said network;

determining, from said measurements made by the user equipment devices, whether there has been a change in interference in a femtocell layer or a macrocell layer requiring a new carrier or scrambling code to be reselected;

if there has been such a change in interference, rerunning, at the basestation, the said first set of algorithms performed on power up for selection of a carrier, a scrambling code, and maximum total downlink power; and if there has not been such a change in interference, setting a maximum value for a total transmit power of the basestation based on said measurements made by user equipment devices and based on knowledge of round trip delays for a communications path between said basestation and a user terminal within a target coverage area, and based on a predetermined maximum permitted round-trip delay.

\* \* \* \* \*